United States Patent [19]

Boes

[11] Patent Number: 5,149,060

[45] Date of Patent: Sep. 22, 1992

[54] METHOD OF FABRICATING AN ORNAMENTAL FENCE POST OR FENCE COLUMN STRUCTURE

[76] Inventor: Roger T. Boes, 3713 Bixler, Metairie, La. 70001

[21] Appl. No.: 446,303

[22] Filed: Dec. 5, 1989

Related U.S. Application Data

[63] Continuation-in-part of Ser. No. 367,245, Jun. 16, 1989, which is a continuation of Ser. No. 251,914, Sep. 9, 1988, Pat. No. 4,858,891.

[51] Int. Cl.⁵ ............................................. B21F 27/00
[52] U.S. Cl. .................................. 256/21; 256/DIG. 5
[58] Field of Search .................... 5/279 R, 279 D, 281; 256/DIG. 5, 21, 22

[56] References Cited

U.S. PATENT DOCUMENTS

| | | |
|---|---|---|
| 44,859 | 11/1863 | Rastetter . |
| 58,300 | 9/1866 | Rose . |
| 162,999 | 5/1875 | Cornell et al. . |
| 176,933 | 2/1856 | Spector . |
| 250,046 | 11/1881 | Rogers . |
| 256,106 | 9/1882 | Lee . |
| 301,108 | 7/1884 | Furness . |
| 754,119 | 3/1904 | Brooks . |
| 1,316,893 | 9/1919 | Hohaus . |
| 1,545,456 | 7/1925 | Rastetter . |
| 1,959,756 | 5/1934 | Ferm ................................. 189/25 |
| 2,027,493 | 1/1936 | Thilborger ........................... 256/19 |
| 2,073,947 | 3/1937 | Sander ................................ 256/24 |
| 2,766,015 | 10/1956 | Farmer ............................... 256/19 |
| 3,080,149 | 3/1963 | PilBoue .............................. 256/57 |
| 3,267,805 | 8/1966 | Ackerman ............................. 88/82 |
| 3,339,895 | 9/1967 | Kusel et al. ......................... 256/22 |
| 3,711,066 | 1/1973 | Niemiec ............................. 256/19 |
| 3,801,072 | 4/1974 | Newberry, Jr. ...................... 256/19 |
| 3,957,250 | 5/1976 | Murphy ............................... 256/19 |
| 4,053,140 | 10/1977 | Clemens ............................. 256/19 |
| 4,060,222 | 11/1977 | Pitkin et al. ....................... 256/50 |
| 4,181,764 | 1/1980 | Totten ............................... 428/155 |
| 4,324,388 | 4/1982 | Klaser ............................... 256/19 |
| 4,357,000 | 11/1982 | Tisbo et al. ....................... 256/26 |
| 4,516,756 | 5/1985 | Beatty ............................... 256/1 |
| 4,540,160 | 9/1985 | Zanavich et al. .................... 256/19 |

FOREIGN PATENT DOCUMENTS

| 4967 | of 1887 | United Kingdom ............... 5/279 R |
| 4232 | of 1891 | United Kingdom ............... 5/279 D |
| 2932 | of 1895 | United Kingdom ............... 5/279 R |

Primary Examiner—Andrew V. Kundrat
Attorney, Agent, or Firm—C. Emmett Pugh

[57] ABSTRACT

Apparatus and method of fabrication for a fence post or column comprising a multiplicity of ornamental sections configured to assemble about an elongated, central support member such as steel tubing or the like to form a single simulated wrought iron ornamental fence post, column or the like. The present invention teaches welded, adhesive, and frictional means of joining the ornamental sections to the support member. The system of the present invention allows the user to configure the post or column in a multitude of arrangements, and is adaptable to various length support members.

4 Claims, 3 Drawing Sheets

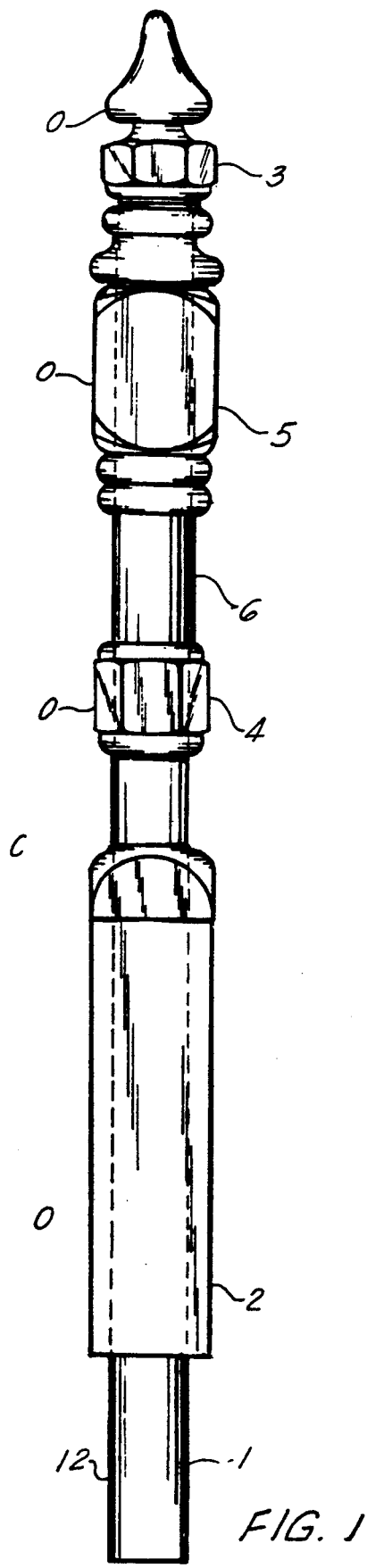
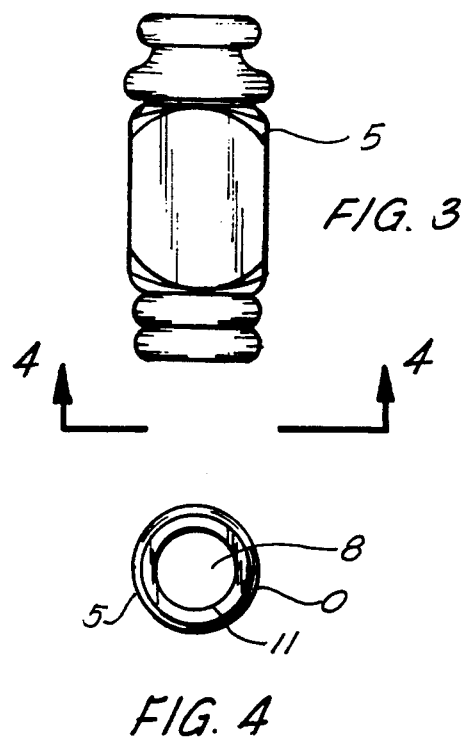
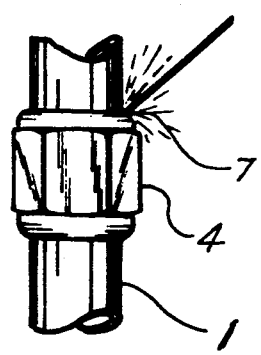
FIG. 1
FIG. 3
FIG. 4
FIG. 2

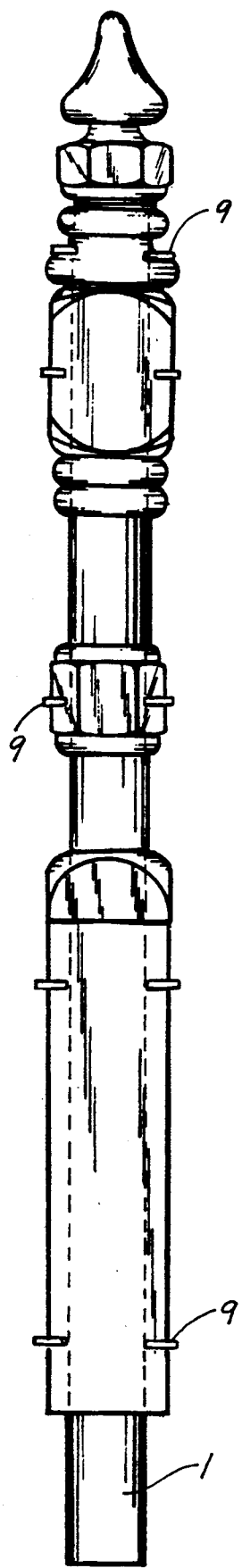
FIG. 9
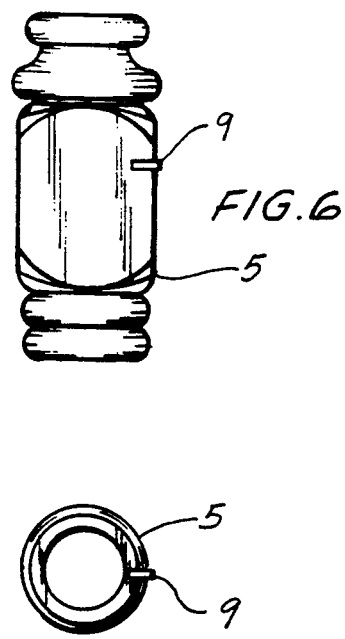
FIG. 6
FIG. 7
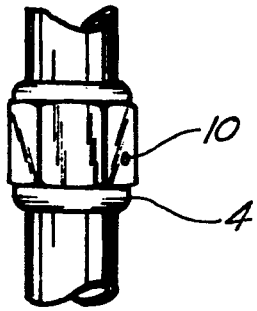
FIG. 8

METHOD OF FABRICATING AN ORNAMENTAL FENCE POST OR FENCE COLUMN STRUCTURE

STATEMENT OF CONTINUING APPLICATION

The present application is a continuation-in-part of U.S. patent application Ser. No. 07/367245 filed Jun. 16, 1989, which is a continuation of U.S. Pat. No. 4,858,891, U.S. Ser. No. 07/251,914 filed Sep.9, 1988, issued Aug. 22, 1989, and entitled "Fiberglass Fence Post or Column Structure".

BACKGROUND OF INVENTION

1. Field of Invention

The present invention relates to fence posts and columns of an ornamental nature, such as those exemplified in the spanish wrought iron designs of the 18th and 19th centuries, and more particularly to a device and method of fabrication for a fence post or column comprising a multiplicity of ornamental sections configured to assemble about an elongated, central base structure such as tubing to form a single simulated wrought iron ornamental fence post or the like.

2. Prior Art & General Background

The ornamental fence posts and/or columns exemplified in the past typically were constructed of cast or wrought iron or the like. These fences required constant painting to prevent rust and are surprisingly fragile due to the brittle nature of cast iron. In addition, the costs of fabricating an ornamental iron fence post or column has increased dramatically over the years, to the point of making them prohibitively expensive.

While the prior art apparently does not anticipate the present invention, it does teach various devices and methods regarding the utilization of a material other than that traditionally contemplated for the construction of fences and fence posts or columns.

Prior patents which may be of interest are listed below:

| Patent No. | Patentee(s) | Year of Issue |
|---|---|---|
| 44,859 | H. O. Rastetter | 1913 |
| 58,300 | S. H. Rose | 1866 |
| 162,999 | J. B. Cornell et al | 1875 |
| 176,933 | L. Spector | 1956 |
| 250,046 | T. Rogers | 1881 |
| 256,106 | R. B. Lee | 1882 |
| 301,108 | A. W. Furness | 1884 |
| 754,119 | J. C. Brooks | 1904 |
| 1,316,893 | G. E. Hohaus | 1919 |
| 1,545,456 | H. O. Rastetter | 1925 |
| 1,959,756 | J. F. Ferm | 1934 |
| 2,027,493 | W. J. Thilborger | 1936 |
| 2,073,947 | J. A. Sander | 1937 |
| 2,766,015 | W. R. Farmer | 1956 |
| 3,080,149 | P. M. PilBoue | 1963 |
| 3,267,805 | G. H. Ackerman | 1966 |
| 3,339,895 | E. J. Kusel et al | 1967 |
| 3,711,066 | Niemiec | 1973 |
| 3,801,072 | Newberry, Jr. | 1974 |
| 3,957,250 | Murphy | 1976 |
| 4,053,140 | Clemens et al | 1977 |
| 4,060,222 | Pitkin et al | 1977 |
| 4,181,764 | Totten | 1980 |
| 4,324,388 | Klaser | 1982 |
| 4,357,000 | Tisbo et al | 1982 |
| 4,516,756 | Beatty | 1985 |
| 4,540,160 | Zanavich et al | 1985 |

U.S. Pat. No. 3,711,066 issued 1973 and entitled "Snap Lock Plastic Fencing" teaches a plurality of adjacent fence sections "to produce decorative and protective borders for lawns, gardens, and flower beds". The sections are composed integrally of molded plastic and include at least two stake members for easy installation.

U.S. Pat. No. 4,060,222 issued in 1977 and entitled "Prefabricated Fencing System" teaches an easily installed, prefabricated fencing structure composed of plastic and includes a "rod driven axially through the post into the ground to eliminate the need for post hole digging".

The above cited patents contemplate plastic fences for placement on lawns, pastures and the like and do not incorporate, to a significant degree, non-plastic components for structural stability in the manner contemplated in the present invention. Additionally, the fabrication process as contemplated for in the prior art is obviously distinguishable from the present invention.

U.S. Pat. No. 3,801,072 issued 1974 and entitled "Fence Panel" teaches a fiberglass fencing panel which "duplicates the physical appearance of the original panel on one face and includes an integrally formed mounting frame on the opposite face". The panels are supported between the conventional fence posts to form a fiberglass fence having the "physical appearance of a conventional fence".

This patent is likewise distinguishable from the present invention, which teaches a fence post and not a panel, and has a new and unique means of fabrication utilizing separate ornamental parts configured to slidingly engage a support member of steel tubing or the like, wherein said parts are arranged and affixed permanently in place to form a single ornamental fence post or column.

3. General, Summary Discussion of the Invention

The present invention overcomes these prior art problems by providing a system which is highly reliable, relatively economical and very cost effective.

The present invention comprises a new and unique method and apparatus in the form of an ornamental fence post or column utilizing a multiplicity of cast ornamental members designed to engage the support member, which may comprise steel tubing or the like, in such a manner so as to form a fence post or column having an wholly authentic wrought iron appearance.

The exemplary embodiment of the present invention may be used in the manufacture of whole, prefabricated fence posts or columns for public sale and use, or may be offered in "kit" form for assembly by the consumer in their own "custom" design. The ornamental section members may be designed based upon traditional wrought iron designs such that the assembled, present invention is almost undistinguishable from the original model.

As enumerated above, the present invention has many desirable characteristics over traditional wrought iron fencing. For example, the present invention is stronger, utilizing a "base" support member of tubular steel or the like, which is stronger lighter, not as brittle as wrought iron, and is much less expensive than traditional full castings. Further, the present invention may be easily "customized" to the particular application, as the ornamental section members are, for the most part, designed to be used interchangeably.

In fabricating a wrought iron fence post or column, one must weld together the various components, usually in the form of two cast halves; this can be a very costly and time consuming process on its own. With the alternative embodiment of the present invention, one uses friction engagement means to affix the ornamental members in place, taught as a bolt threadingly engaged to the wall of the ornamental cast member, such that the bolt engages the support post, thereby providing an engagement which may be assembled and disassembled with relative ease. This may be accomplished with the ornamental members of the present invention as they are smaller in size than whole posts, may be cast as one piece economically using a special "coated sand" process.

The ornamental cast members may then be configured to slidingly engage with the support post or tube to the desired position, and the friction bolt tightened to affix the member in place. Other embodiments which do not teach the friction bolt as a feature may use epoxy glue or other adhesive, as well as traditional welding techniques to affix the member to the support post, with good results The present system is much more cost effective, both in terms of labor and material over the prior art. Yet, the present invention has the same appearance of the traditional wrought iron which it imitates; the intricacy of the design of the wrought iron model is duplicated in the ornamental members. The result is that one may copy an existing design for a wrought iron post or column, and thereby construct a less expensive, yet authentic appearing steel reenforced version.

Further, the ornamental members taught in the present invention may be made of a variety of materials, including, for example, wrought iron, steel, aluminum, plastic, PVC, or fiberglass. As discussed above, the ornamental members may be affixed to the base via tack weld, adhesive, or a friction connection via threaded screw or nut and bolt arrangement.

It is thus an object of the present invention to provide an ornamental fence post or column which is durable, easily fabricated, cost effective, and does not require maintenance.

It is a further object of the present invention to provide a fence post or column which is attractive in appearance and which duplicates traditional wrought iron designs in an authentic manner.

It is further an object of the present invention to provide a fence post or column which is reinforced with steel or the like in such a manner as to further increase its structural stability.

It is still further an object of the present invention to provide a fabrication method for ornamental fence posts or the like which may duplicate traditional wrought iron designs and provide for a manner in which to incorporate steel reinforcement.

It is still further an object of the present invention to provide an ornamental fence post or column "kit" comprising of a plurality of ornamental members which can be mounted to an elongated base of steel or the like in a variety of configurations, based upon the desires of the consumer.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1 is a side view of the preferred embodiment of the ornamental fencepost or column kit of the present invention illustrating the reenforcement post (in phantom) relative the ornamental members and an exemplary arrangement of the ornamental members to form a post of authentic ornamental cast appearance.

FIG. 2 is a side view of the preferred embodiment of the present fencepost or column kit of the present invention illustrating the placement and tack welding or other affixing of an exemplary ornamental member to the reinforcement post.

FIG. 3 is a side view of an exemplary ornamental member, illustrating the one piece, molded structure.

FIG. 4 is a top view of an exemplary ornamental member, illustrating the one piece, molded structure and uniform core of like configuration and diameter to the exemplary reinforcement post.

FIG. 6 is a side, partially cut-away view of an exemplary ornamental member of the present invention, illustrating an the alternative feature of a threadingly engaged bolt or the like for frictionally engaging the member to the reinforcement tubing.

FIG. 7 is a op, partially cut-away view of an exemplary ornamental member of the present invention, illustrating an the alternative feature of a threadingly engaged bolt or the like for frictionally engaging the member to the reinforcement tubing.

FIG. 8 is a side view of an exemplary ornamental member of the present invention, illustrating an exemplary placement and configuration of the threaded borehole for the bolt.

FIG. 9 is a side view of the fencepost or column kit of the present invention, illustrating a number of exemplary ornamental members frictionally assembled to a reinforcement tube (parts in phantom) via frictionally engaged threaded members to form a post of column having authentic cast or wrought iron appearance.

DETAILED DESCRIPTION OF THE PREFERRED, EXEMPLARY EMBODIMENT(S)

Figure 5:
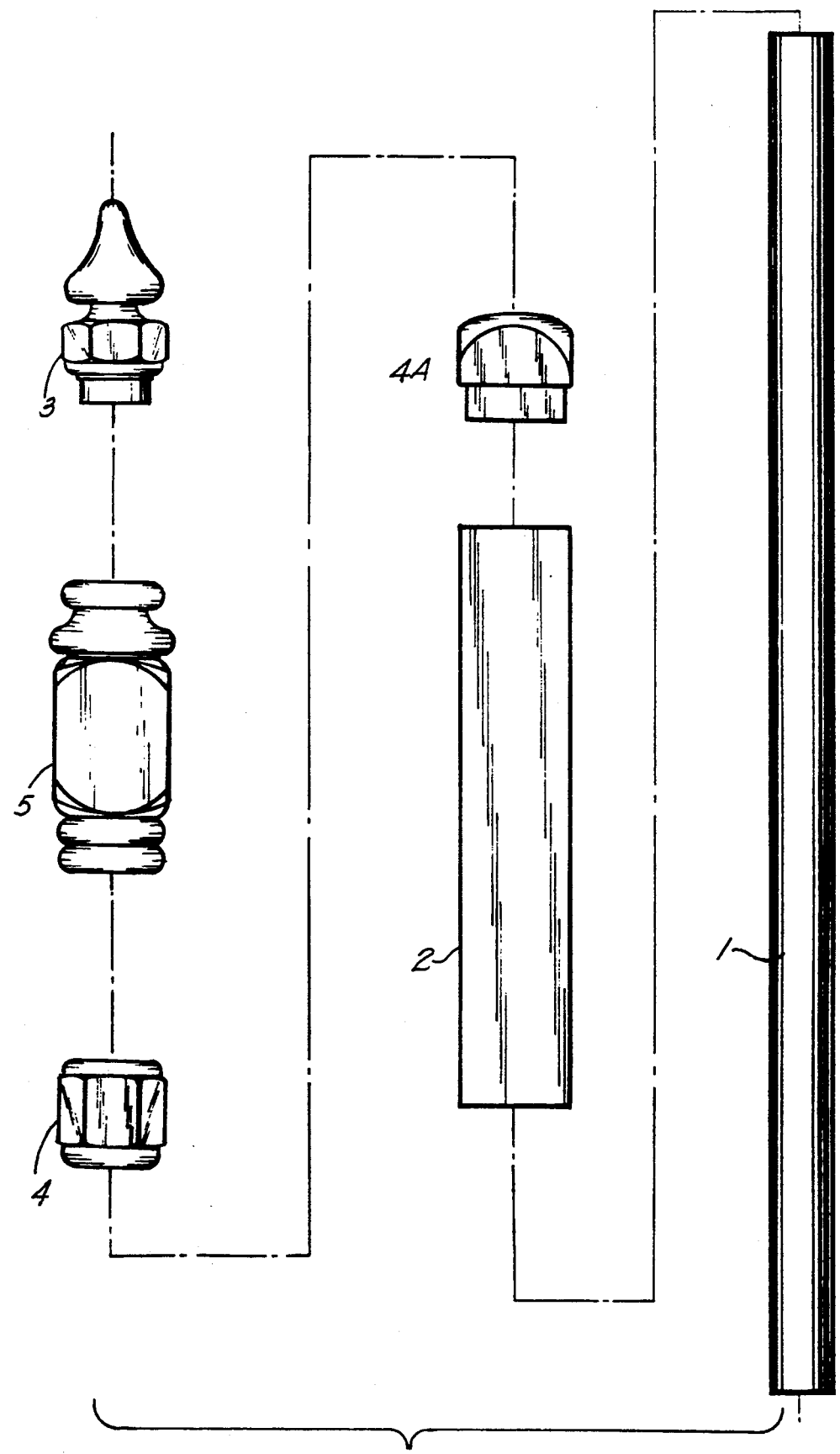
FIG. 5 is a side, exploded view of the fencepost or column kit of the present invention, illustrating various exemplary ornamental members and the order of installation to a length of reinforcement tubing, thereby forming an authentic, ornamental wrought iron appearance.

As can be seen in FIGS. 1 and 2, the fencepost or column C of the preferred, exemplary embodiment of the present invention includes means for increasing the structural stability of the fencepost or column in the form of a tubular or other elongated support member 1 of steel or the like, having a diameter of approximately three inches, positioned in the center of the fencepost or column C. Support member 1 in the exemplary embodiment extends approximately one foot exterior to the base member 2 of the fencepost or column C in order to provide a stable means of anchoring the fencepost or column C in concrete or the like.

As enumerated supra, the present invention comprises the implementation of a plurality of ornamental members designed and provided in "kit" form for placement via sliding engagement about an elongated support member to form a fencepost or column having the appearance of a wholly cast wrought iron or like structure. An exemplary ornamental member O, illustrating the intermediate member 5 of the present invention, is shown in FIG. 3.

As illustrated in FIG. 1, the ornamental members O are slidingly engaged over elongated support member 1 to form post or column C. In forming post or column C, a number of varyingly exterior configured ornamental members O are used, including a top post or cap member 3, intermediate member 5, median member 4, and base 2.

As illustrated in FIGS. 4 & 5, the ornamental members O are designed to have like core configurations 8 relative the exterior configuration of support member 1 and sufficient tolerance such that the inner wall of ornamental members 11 slidingly communicates with the outer wall 12 or configuration of support post 1.

As further illustrated in FIG. 5, the post or column C of the present invention is assembled via the sliding engagement, positioning, and affixing of ornamental members O in the desired vertical order. The base of the structure, comprising rectilinear member 2 and base cap member 4, is slid over support member 1 and may be spaced to allow for some extension of support member 1 through said base to allow for placement in concrete or the like. The slidingly engaged and positioned base member 2,4A may then be affixed in place by tack weld 7, fiberglass or epoxy glue, or other adhesive means such as fiberglass glue, epoxy glue, or one or the many metal adhesives on the market.

Next, median 4, intermediate 5, and top 3 ornamental members O may be engaged and affixed in positions as desired. Of course, the base 2, 4a and top 3 members in almost all situations must form the top and bottom positions of the column or post C, respectively. However, the median 4 and intermediate 4 members may be interchanged regarding positioning. It may be desirous to space 6 the ornamental members as shown in FIG. 1.

The various ornamental members taught in the above embodiment are intended to demonstrate the present invention in exemplary terms only, and is not intended to reflect the whole invention. Other configuration ornamental members may be used in different numbers and positions, and the support member 1 may vary in length, diameter, and exterior configuration. Further, it is not necessary that there by one intermediate and one median member, and the number can vary according to the length of the support member and the desire of the user.

In the slidingly engaged embodiment illustrated above, the interior wall 11 of the ornamental member O should be configured to engage with the exterior wall 12 of support member 1 with sufficient tolerance to allow sliding engagement.

However, the present invention is not limited to slidingly engaged ornamental members, and may be used in other alternative embodiments with ornamental members cast in halves or other portions, and engaged to form a single member O on the support member 1 when affixed thereto. However, all cast members should have an interior wall sufficiently configured to allow the support member 1 to pass therethrough upon assembly.

An alternative embodiment of the present invention is shown on FIGS. 6-9, wherein a frictionally engaged version of the present invention is illustrated.

In this alternative embodiment, the conventional support post 1 is used, but the ornamental members O include vertical threaded bores 10 therein wherein a threaded member 9 such as a screw or bolt is placed.

In installation, the ornamental member O, as shown in FIG. 8 as median member 4, is slidingly engaged over the support member 1 to the desired position. Thereafter, the installer merely tightens threaded screw or bolt 9 until it intersects with support member 1. The base, intermediate, and top members would be similarly installed. An exemplary design and configuration of the threaded embodiment of the intermediate member 5 is illustrated in FIGS. 6 & 7.

An unsophisticated consumer can therefore purchase the present kit comprising the base, top, median, and/or intermediate ornamental members, any other similarly configured ornamental accessories, as well as a support post, column, or other member, and configure and assemble a post having the appearance of single piece, wrought or cast iron to his needs in minutes. The exemplary support member of the present invention comprises an inexpensive three inch diameter steel post, but of course various materials, configurations and lengths may be implemented with the present system. This is a product that substantially decreases the cost and labor of producing ornamental, cast or wrought appearing posts or columns, with structural characteristics superior over traditional iron structures.

While the preferred embodiment of the present invention contemplates ornamental members having a single piece construction, other constructed ornamental members may be used with satisfactory results. However, such ornamental members may have spaces, lines, cracks or the like evidencing where the parts where joined, decreasing the authentic appearance of the structure.

The present inventions preferred, unitary construction ornamental pieces are now made possible due to a new method of fabrication which incorporates a comparative unique molding system, and wherein a single piece member may be made having an open, uniform, central core 8 designed to envelope the outer diameter of support member 1.

The embodiment(s) described herein in detail for exemplary purposes are of course subject to many different variations in structure, design, application and methodology. Because many varying and different embodiments may be made within the scope of the inventive concept(s) herein taught, and because many modifications may be made in the embodiment(s) herein detailed in accordance with the descriptive requirements of the law, it is to be understood that the details herein are to be interpreted as illustrative and not in a limiting sense.

What is claimed is:

1. A method of fabricating a fence post or fence column having the appearance of a one-piece, traditional ornamental cast or wrought iron fence post or fence column, comprising the following steps:
   a. Providing an elongated support member of a specific length having an axial cavity therethrough and an upper area and having a specific configuration relative its elongated surface;
   b. Providing a kit comprising a plurality of ornamental members of varying exterior sizes, design and appearances, having interior and exterior walls and vertical cavities therethrough sized and configured to slidingly engage said elongated support member and associated means to affix said ornamental members to said elongated support member, said ornamental members further including
      a base member having a length of about one-quarter to one-half the total height of the elongated support member, and having an exterior diameter substantially greater than said elongated support member,
      at least one medial ornamental member of lesser length than said base member, at least one upper ornamental member of lesser length than said base member juxtaposed to the upper area of said elongated support member, and an ornamental capping member juxtaposed said upper ornamental area, said ornamental capping member covering said cavity of said elongated support member; and c. sequentially slidingly engaging each of said ornamental members individually over said elongated support member, and attaching said ornamental members to said support member to form a fence post or column having the appearance of a one-piece, traditional wrought iron fence post or fence column, in the following arrangement, from bottom to top at the bottom, said base member, positioned above the terminal end of the support member to provide means for anchoring the support member in concrete, above said base member, at least one of said medial ornamental members, above said medial ornamental member, at least one of said upper ornamental members, and above said upper ornamental member, said ornamental capping member, thereby forming a complete fence post or fence column.

2. The method of claim 1 wherein step b also comprises the step of making a threaded horizontal bore penetrating through said exterior and interior walls of said ornamental members.

3. The method of claim 2, wherein there is included the additional step of providing a threaded member having a first and second end, said threaded member configured to engage said threaded horizontal bore of each said ornamental member, said threaded member of sufficient length to simultaneously fictionally engage said horizontal bore of said ornamental member, said threaded member having a second end configured to facilitate the frictional engagement of said threaded member to said exterior wall of said support member.

4. The method of claim 3 where step "c" comprises the following steps:

threadingly engaging said threaded member with said horizontal threaded bore and continuing to tighten said threaded member until it fictionally engages said exterior wall of said support member, affixing said ornamental member to said support member.

* * * * *